(12) United States Patent
Kawai et al.

(10) Patent No.: US 7,984,584 B2
(45) Date of Patent: Jul. 26, 2011

(54) METHOD FOR FUNGAL BED CULTIVATION OF MUSHROOM

(75) Inventors: Takashi Kawai, Shiga (JP); Hiroko Ohta, Shiga (JP); Katsuhiko Kusakabe, Shiga (JP); Akihiko Kita, Shiga (JP); Ikunoshin Kato, Shiga (JP)

(73) Assignee: Takara Bio Inc., Shiga (JP)

( * ) Notice: Subject to any disclaimer, the term of this patent is extended or adjusted under 35 U.S.C. 154(b) by 36 days.

(21) Appl. No.: 12/129,557

(22) Filed: May 29, 2008

(65) Prior Publication Data

US 2008/0295399 A1 Dec. 4, 2008

(30) Foreign Application Priority Data

May 29, 2007 (JP) ................................. 2007-142576
Jun. 14, 2007 (JP) ................................. 2007-157046

(51) Int. Cl.
 *A01G 1/04* (2006.01)
(52) U.S. Cl. .......................................................... 47/1.1
(58) Field of Classification Search ...................... 47/1.1
See application file for complete search history.

(56) References Cited

U.S. PATENT DOCUMENTS

| | | | | |
|---|---|---|---|---|
| 3,328,911 A | * | 7/1967 | Bennett ............................. | 47/1.1 |
| 2006/0112618 A1 | * | 6/2006 | Kawai et al. ..................... | 47/1.1 |
| 2008/0295399 A1 | * | 12/2008 | Kawai et al. ..................... | 47/1.1 |
| 2009/0148926 A1 | * | 6/2009 | Kawai et al. ............... | 435/256.8 |

FOREIGN PATENT DOCUMENTS

| | | | |
|---|---|---|---|
| CN | 101317537 A | * | 12/2008 |
| JP | 475538 | | 3/1992 |
| JP | 4211308 | | 8/1992 |
| JP | 5268942 | | 10/1993 |
| JP | 6153695 | | 6/1994 |
| JP | 7115844 | | 5/1995 |
| JP | 1196668 | | 7/1999 |
| JP | 2000106752 | | 4/2000 |
| JP | 2000209944 | | 8/2000 |
| JP | 2001120059 | | 5/2001 |
| JP | 2002233239 | | 8/2002 |
| JP | 2002247917 | | 9/2002 |
| JP | 2005027585 | | 2/2005 |
| JP | 2006115834 | | 5/2006 |
| JP | 2007054044 | | 3/2007 |
| WO | WO 2004075627 A1 | * | 9/2004 |

OTHER PUBLICATIONS

Barbara J. Euser, Growing Mushrooms in the Garden, Jan. 3, 2005, University of California Agriculture & Natural Resources, Marin County Cooperative Extension, One page.*
Akira Ohta, Cultural Conditions for Commercial Production of *Lyophyllum shimeji*, 1998. Shiga Forest Research Center, Kitasakura, Yasu, Shiga, p. 520-2321.*
Akira Ohta, Culture Conditions for Commercial Production of *Lyophyllum shimeji*, 1998, vol. 39, pp. 13-20, Shiga Forest Research Center, Kitasakuran, Yasu, Shiga 520-2321, Japan.*
Akira Ohta, "Culture conditions for commercial production of *Lyophyllum shimeji*", vol. 39, pp. 13-20, 1998.
Official Action dated Aug. 31, 2010 issued in the corresponding Chinese Patent Application No. 200810142883.4, together with its English translation.

* cited by examiner

*Primary Examiner* — Francis T Palo
(74) *Attorney, Agent, or Firm* — Browdy and Neimark, PLLC

(57) ABSTRACT

Problem: To provide a method for fungal bed cultivation of a mushroom of a large size having an excellent shape and crunchy texture, a mushroom cutting useful for the fungal bed cultivation method, a culture medium for fungal bed cultivation into which the cutting is transplanted, and a culture medium suitable for fungal bed cultivation.
Solution: A method for cultivating a mushroom in a fungal bed comprising a step of transplanting an isolated cutting of the mushroom into a culture medium for fungal bed cultivation, an isolated cutting of a mushroom to be used in the method, and a culture medium for fungal bed cultivation of a mushroom into which the cutting is transplanted.

6 Claims, No Drawings

METHOD FOR FUNGAL BED CULTIVATION OF MUSHROOM

TECHNICAL FIELD

The present invention relates to a method for fungal bed cultivation of a mushroom of a large size having an excellent shape and crunchy texture, a mushroom cutting useful for the fungal bed cultivation method, a culture medium for fungal bed cultivation into which the cutting has been transplanted, and a culture medium suitable for fungal bed cultivation.

BACKGROUND ART

As a method for artificially cultivating a mushroom, there is fungal bed cultivation. In general, the fungal bed cultivation is carried out, first, by filling a cultivation bottle with a culture medium for a fungal bed, making a hole for inoculating a solid or liquid seed culture, and sterilizing the culture medium. Then, a seed culture suitable for the culture medium for a fungal bed is inoculated thereon, followed by cultivating the seed culture and, if necessary, after subjecting to operations such as scratching fungi, sprouting from the seed culture to generate fruit bodies in the form of a bunch from a surface of the fungal bed and harvesting a mushroom in the form of a bunch.

However, currently, since mushrooms in the forms of a bunch are in the marketplace in gross, they are not novel to general consumers. Furthermore, even if a breed having superior characteristics such as taste, as compared with those of conventional breeds is developed, differentiation of the breed from conventional ones would be difficult as long as their shapes are similar. Therefore, development of a mushroom of a large size having a sufficient presence even if it has only one fruit body rather than fruit bodies in the form of a bunch has been desired.

However, cultivation of a mushroom of a large size having high commercial value with uniform quality has been difficult because a bunch of mushrooms in clumps obtained by a conventional method have uneven thicknesses of stalks and sizes of pilei.

Then, recently, methods for fungal bed cultivation of a mushroom to obtain a fruit body of a large size mushroom have been investigated. For example, a method for cultivating an eryngii mushroom, which comprises controlling sprouting by maintaining a low humidity environment of less than 75% and a high humidity environment of 75% or more at a given interval within the environmental humidity range of from 50 to 100%, whereby a primordium is grown through vanishing within 5 days sprouting water generated when forming the primordium, has been proposed (for example, Patent Documents 1 and 2).

Further, in fungal bed cultivation of a shimeji mushroom, in particular, a bunashimeji mushroom, a method for cultivating a shimeji mushroom of a large size, which comprises sprouting through an aperture of a circular shape or approximately circular shape having an effective diameter of from 5 to 30 mm provided on the top surface of a cap set on the mouth of a cultivation bottle, has been reported (for example, Patent Document 3).

Furthermore, in fungal bed cultivation of a mushroom, a method for fungal bed cultivation of a mushroom, which comprises selecting one sprout showing good growth from plural sprouts generated on the side surface or bottom portion of a hole made on a culture medium of the bed by carrying out such a sophisticated operation that all the sprouts except the selected one are removed, followed by growing the sprout to form one fruit body per hole, has been disclosed (for example, Patent Document 4).

Patent Document 1: JP 2000-209944 A
Patent Document 2: JP 2002-233239 A
Patent Document 3: JP 11-196668 A
Patent Document 4: JP 2006-115834 A

SUMMARY OF THE INVENTION

Problem to be Solved by the Invention

However, the method described in the above-mentioned Patent Document 1 or 2 involves complicated operations because the method requires alternation of the environmental humidity in a sprouting chamber during cultivation, or requires multiple sprouting chambers having different environmental humidity. Further, in the method described in Patent Document 3, plural fruit bodies in the form a bunch radiating from an aperture are formed. Thus, it is difficult to obtain a fruit body having a fine shape and, in particular, the shape and size of a stalk cannot give satisfaction because root portions of the fruit bodies are in close formation.

Moreover, in fungal bed cultivation of a mushroom, in particular, a hon-shimeji mushroom, voids may be formed in the stalk of a fruit body in accordance with the increase in the size of the fruit body, which may deteriorate commercial value of the fruit body.

As described in Patent Document 4, the present inventors have found that a fruit body in a large size exceeding 20 g by weight per fruit body, having a straight and thick stalk, a high density of mycelia and a dense body as well as excellent appearance and texture can be obtained by making a hole on a culture medium, selecting a sprout from plural sprouts generated on the side surface or bottom portion of the hole, and growing the sprout to generate one fruit body per hole. However, in this case, sometimes, no spore is formed in a hole, or a large number of sprouts are formed in a hole, which makes it difficult to select one sprout from them, and a fruit body of the desired shape cannot be harvested. Thus, it has been difficult to achieve a stable yield. For this reason, in commercial cultivation, development of a method of more stable cultivation has been desired. Further, development of a culture medium that can be used for stable cultivation has also been desired.

Accordingly, an objective of the present invention is to provide a method for cultivating a fruit body of a mushrooms of a large size, which is not in the form of a bunch, with excellent shape and high commercial value that greatly facilitates production control.

Means for Solving the Problem

The present inventors have continued intensive studies for obtaining a fruit body of a large size in a stable manner. As a result, they have surprisingly found that, when a fruit body of a mushroom differentiated from a primordium, preferably a young fruit body, is isolated from a culture medium for fungal bed cultivation, transplanted as a cutting into a culture medium for fungal bed cultivation in which fungal mycelia have extended throughout the culture medium, and grown in the culture medium, the fruit body of the mushroom differentiated and isolated from the fungal bed binds again and fuses to the mycelia in the culture medium, and grows into a matured fruit body that can be shipped as a commercial product. In addition, the present inventors has succeeded in development of a culture medium for fungal bed cultivation suitable for large-scale commercial production of a hon-shimeji mushroom, a suitable cultivar in the present invention, thereby completing the present invention.

That is, in brief, the first aspect of the present invention relates to a fungal bed cultivation method comprising transplanting an isolated mushroom cutting into a culture medium for fungal bed cultivation. In an embodiment of the first aspect of the present invention, the mushroom cutting is a fruit body of a mushroom cultivated in a culture medium for fungal bed cultivation. An example of the fruit body is a young fruit body. Further, the culture medium for fungal bed cultivation is one in which fungal mycelia have extended throughout the culture medium. Further, the first aspect of the present invention is suitable for cultivation of a hon-shimeji mushroom (*Lyophyllum shimeji*). The culture medium for fungal bed cultivation into which a mushroom cutting is transplanted may be the original one from which the cutting has been isolated, or a separately prepared culture medium for fungal bed cultivation medium in which mushroom mycelia have extended throughout the culture medium. The cutting may be appropriately used after isolation, or it may be used after storage in a clean place. The storage time can be appropriately determined depending on the conditions of the cutting.

The second aspect of the present invention relates to an isolated mushroom cutting used for the first aspect of the present invention. In an embodiment of this aspect, the cutting is a mushroom fruit body cultivated by fungal bed cultivation. Preferably, the cutting is a young fruit body. In a preferred embodiment of the second aspect of the present invention, the cutting is that of a hon-shimeji mushroom (*Lyophyllum shimeji*).

The third aspect of the present invention relates to a culture medium for fungal bed cultivation into which the mushroom cutting of the second aspect of the present invention is transplanted.

Further, as the fourth aspect, the present invention provides a culture medium suitable for fungal bed cultivation of a hon-shimeji mushroom. The culture medium is that for fungal bed cultivation of a hon-shimeji mushroom which comprises sawdust and corn. This culture medium is characterized in that the sawdust is solely derived from a conifer.

The present invention also provides a method of fungal bed cultivation of a hon-shimeji mushroom comprising inoculating a hon-shimeji mushrooms in the culture medium for bed cultivation medium according to the fourth aspect of the present invention which is in a wet state with water to generate a fruit body thereof. Naturally, the culture medium of the fourth aspect of the present invention can preferably used for the fungal bed cultivation method according to the first aspect of the present invention.

EFFECT OF THE INVENTION

According to the present invention, there is provided a method for cultivating a mushroom comprising transplanting a mushroom cutting into a culture medium. Further, there is provided a culture medium for fungal bed cultivation which can be preferably used for the above cultivation method. The utilization of the present invention will facilitate production control such as locating the generation place of a mushroom, determining harvesting time and achieving the uniformity of the shape. In addition, according to the present invention, it is possible to stably producing a mushroom of a large size having an excellent shape.

BEST MODE FOR CARRYING OUT THE INVENTION

Hereinafter, the present invention will be illustrated in detail.

As used herein, the term a "cutting" of a mushroom refers to a fruit body used in a transplanting step of a mushroom cutting as described hereinafter. Examples of the mushroom cutting include a fruit body, preferably a young fruit body of a mushroom cultivated by fungal bed cultivation. In addition, a fruit body, preferably a young fruit body of a mushroom grown under the illumination of light for a certain period of time after fugal bed cultivation can also be used as the mushroom cutting of the present invention. Although a breed of a mushroom to which the present invention can be applied is not specifically limited as long as it can be used as the cutting of the present invention in the cultivation method described hereinafter, examples thereof include edible mushrooms such as a hon-shimeji mushroom (*Lyophyllum shimeji*), an oyster mushroom (*Pleurotus ostreatus*), a bunashimeji mushroom (*Hypsizigus marmoreus, Lyophyllum ulmarium*), a hatakeshimeji mushroom (*Lyophyllum decastes*), a shiitake mushroom (*Lentinula edodes*), an eryngii mushroom (*Pleurotus eryngii*), *Agaricus blazei* Murril, and the like. Among them, a hon-shimeji mushroom (*Lyophyllum shimeji*) is preferred as one embodiment of the present invention. Examples of the preferred hon-shimeji mushroom are not specifically limited as long as it is a strain applicable to fungal bed cultivation, and include *Lyophyllum shimeji* La01-27 (FERM BP-10960) and *Lyophyllum shimeji* La01-20 (FERM BP-01959).

As used herein, the term "hon-shimeji mushroom" refers to those taxonomically classified into *Lyophyllum shimeji*. Previously, a bunashimeji mushroom was marketed under the trade name of "yamabiko hon-shimeji" or "hon-shimeji". However, a bunashimeji mushroom should be classified into "*Hypsizigus marmoreus*" (which was formerly classified into "*Lyophyllum ulmarium*") ["Kinoko Saibai Sihyo" (Guidelines for Cultivation of Mushrooms), January 1989, edited and published by Nagano prefecture, Nagano Prefectural Central Union of Agricultural Cooperatives, Nagano Prefectural Federation of Economic Agricultural Cooperative Associations, and Nagano Prefectural Forestry Cooperative; Yama-kei Color Meikan, Nippon no Kinoko (Mushrooms in Japan), Yama-kei Publishers co., Ltd., Nov. 10, 1988], and is different from a hon-shimeji mushroom as described herein. This is also evident from the fact that a hon-shimeji mushroom is classified as mycorrhizal fungi, whereas a bunashimeji mushroom is classified as wood-rotting fungi.

As the mushroom cutting, for example, a fruit body differentiated from a mushroom primordium obtained by fungal bed cultivation can be isolated and used. For example, a young fruit body differentiated from a mushroom primordium (in such a state that a grey-white pileus is formed at the apical portion of the primordium) is preferred, and more preferably, a young fruit body of at least 5 mm length is used as the cutting. A mushroom cutting of less than 5 mm length is difficult to handle in the cultivation, for example, is difficult to transplant in an upright position, though the use of such a cutting is also within the scope of the present invention. The upper limit of the length of the cutting can be appropriately determined according to its growth properties. Usually, it is preferable to isolate and collect a young fruit body of 5 to 20 mm length as the cutting to be used in the present invention. The cutting can be used immediately after isolation, or it can also be used after storage in a clean place. The storage period of time can be appropriately determined depending on the conditions of the cutting. The storage conditions are not specifically limited and can be appropriately determined. For example, storage at a low temperature is preferred.

Bottle cultivation, bag cultivation, box cultivation and the like can be applied to the fungal bed cultivation method of a mushroom of the present invention. Herein, the fungal bed cultivation method of a mushroom of the present invention by bottle cultivation is used as an example. This method comprises the steps of preparation of a culture medium, filling a bottle, sterilizing, inoculating, cultivating, scratching fungi if necessary, sprouting, isolating a cutting, transplanting the cutting, growing, harvesting, and the like. These steps will be specifically illustrated hereinafter, but the present invention is not limited thereto.

The step of preparation of a culture medium refers to a step comprising measuring base materials used for fungal bed cultivation, stirring the base materials and adding water to adjust the water content of the culture medium to obtain a wet state with water suitable for the fungal bed cultivation of a mushroom. For example, a culture medium for fungal bed cultivation (also referred to as a medium) of a hon-shimeji mushroom can be appropriately prepared from a combination of wheat or barley, corn, sawdust, other nutrients, and the like. The culture medium is not specifically limited as long as it can be used in the present invention.

The step of filling a bottle refers to a step of filling a bottle with a culture medium. More specifically, it refers to a step comprising filling a heat-resistant wide-mouthed culture bottle of generally from 400 to 2300 mL in volume with the prepared culture medium while applying pressure in an amount of from 800 to 1100 g, preferably from 900 to 1050 g, more preferably from 750 to 850 g when a 1100 mL bottle is used, making one or more holes having an aperture diameter of about from 0.5 to 7 cm, preferably about from 1 to 5 cm, more preferably about from 2 to 4 cm, and a depth of about from 0.5 to 16 cm, preferably about from 2 to 15 cm, more preferably about from 7 to 13 cm in the vicinity of the center portion of the culture medium, and stoppering the bottle with a cap. Although the number of the holes per bottle can be suitably adjusted according to the size of the mouth of the bottle or the size of the hole, it is, for example, from 1 to 10, preferably from 1 to 8, and more preferably from 1 to 6.

The sterilizing step may be any step of killing substantially all bacteria in the culture medium, and is usually carried out at from 98° C. to 100° C. for from 4 to 12 hours when sterilization is carried out under normal pressure, or at from 101° C. to 125° C., preferably at 118° C. for from 30 to 90 minutes when sterilization is carried out under high pressure.

The inoculating step refers to a step of inoculating a seed culture on the culture medium which has been allowed to stand to cool to about 20° C. after sterilization. For example, in the case of a hon-shimeji mushroom, a liquid seed culture obtained by culturing mycelia of a hon-shimeji mushroom in a culture medium comprising glucose, peptone and yeast extract as main components such as a PGY liquid culture medium or a ½ PGY liquid culture medium at 25° C. for from 10 to 15 days is aseptically inoculated in the amount of about from 10 to 50 mL per bottle. Alternatively, a known solid seed culture can be used. For example, a solid seed culture obtained by culturing the culture medium in which a liquid seed culture obtained as above has been inoculated at 25° C. for from 60 to 150 days so that the mycelia extend throughout the culture medium can be used. In this case, the solid seed culture is aseptically inoculated in the amount of about 15 g per bottle. The solid seed culture can be inoculated to, but not specifically limited to, the hole made in the step of preparing the culture medium.

The cultivating step refers to a step of growing and maturing mycelia. For example, when growing a hon-shimeji mushroom, mycelia are usually allowed to extend throughout the culture medium after inoculation at a temperature of from 20° C. to 25° C. and a humidity of from 50 to 80%, and are then matured. The maturation can be omitted. The cultivating step is usually carried out for 60 to 150 days, preferably for about 100 days, when an 850 mL bottle is used.

The sprouting step refers to a step comprising removing the cap from the bottle after completing the cultivating step, scratching fungi, if necessary, and forming and developing young fruit bodies from fruit body primordia (in such a state that grey-white pilei are formed at the apical portions of the primordia). Usually, the sprouting is carried out for 5 to 15 days at a temperature of 10° C. to 20° C., preferably at about 15° C., at humidity of 80% or more and under illumination of 1000 lux or less. Prior to the above cultivating step or the sprouting step, plural holes can be formed on the surface of a fungal bed. Formation of such holes improves the aeration of the culture medium. Since dew condensation is liable to occur due to the humidification during the sprouting step, the fungal bed can be covered with a porous polymer or corrugated sheet for preventing the bed from getting wet. The cultivation can be carried out with inverting the culture bottle.

The isolating step of a cutting refers to a step of isolating a fruit body developed during the sprouting step. A most suitable method can be selected to isolate a cutting depending on the breed of a mushroom. For example, when a mushroom is easy to isolate, a cutting can be collected by hand or using tweezers. When a mushroom is difficult to isolate, the desired fruit body can be isolated and collected using any tool such as a scalpel, a knife, a spatula, and the like.

The transplanting step of a cutting refers to a step of transferring a cutting obtained from the isolating step thereof into any location of a culture medium in which growing of the fruit body is desired.

The culture medium into which a cutting is transplanted may be a culture medium from which the cutting has been isolated (a post-isolation culture medium), or a separately prepared different culture medium in which mushroom mycelia have extended throughout the culture medium, for example, a culture medium of a cultivating step or a sprouting step. Alternatively, a culture media left after a cutting was transplanted and its matured fruit body was harvested can be re-used for this purpose. While any culture medium from such a stage that mycelia have just extended throughout the culture medium to a stage that maturation thereof has completed can be used as a culture medium of a cultivating step, preferably, a culture medium is that obtained after cultivation for at least 70 days, more preferably 80 to 120 days. As a culture medium of a sprouting step, any culture medium from such a stage that sprouting has just started to a stage that sprouting has completed can be used. If fruit body primordia, young fruit bodies and the like are formed in a culture medium into which a cutting is transplanted, such primordia and young fruit bodies can first be removed, and then a young fruit body used as a cutting can be transplanted into the culture medium at the desired location. The young fruit bodies thus removed can, of course, be used as cuttings for the transplantation of the present invention.

The transplantation method is not specifically limited as long as the transplanted cutting can fuse and grow with the mycelia on a fungal bed. The cutting can be transplanted at any location on the surface of the culture medium. For example, it is preferable to engage or embed the cutting into a hole formed in a fungal bed, for example, that for inoculation and aeration purposes, prior to the cultivating or sprouting step. The present inventors have found that this method is most suitable for fusing a cutting with the mycelia extended throughout the culture medium on a fungal bed. Alternatively, a cutting can be inserted into a newly formed hole prior to the transplanting step. The aperture diameter of such a hole is not specifically limited as long as a cutting can be engaged or embedded. Usually, the diameter can be in a range of 2 to 20 mm, preferably 4 to 10 mm. By transplanting and growing one cutting, for example, a young fruit body per hole on the culture medium, a fruit body of a large size having an excellent shape can be produced in an individually independent state without forming a bunch. Transplanting several young fruit bodies per hole is also included as one embodiment of the present invention. In such an embodiment, although the fruit bodies are adhered to each other at their root portions to form a bunch, such adhesion is limited to very small basal portions of the fruit bodies and they are easily separated from one another, thereby obtaining a fruit body of a large size having an excellent shape in an individually independent state like that obtained by transplanting one young fruit body per hole. Furthermore, it is possible to obtain mature fruit bodies with uniform sizes by such a cultivation control that fruit bodies to be used as cuttings are grouped according to their sizes and cuttings of similar sizes are transplanted into a culture medium.

When a cutting, for example, a young fruit body is transplanted, for example, by inserting it into a hole, preferably, the fruit body is transplanted so that it is in an upright position and brought into contact with a culture medium at a part thereof.

The growing step refers to a step of allowing to grow a primordium of a fruit body or a young fruit body into a matured fruit body that can be harvested. Specifically, in the present invention, it refers to a step of forming a matured fruit body from a transplanted cutting. Usually, this step is carried out for 5 to 15 days under the conditions almost similar to those employed in the sprouting step except that the illumination of 2000 lux or less is used. In the growing step, wetting of a fruit body due to dew condensation in a growing chamber does not significantly affect the growth.

According to the above-mentioned steps, a matured fruit body can be obtained and the fruit body is then harvested. Thus, all the steps of cultivation are terminated.

Although the present invention has been described with reference to an example of bottle culture of a hon-shimeji mushroom, it should be understood that the present invention is not limited to bottle culture. For example, for cultivating a hatakeshimeji mushroom, fungal bed cultivation is carried out by using the method described, for example, in JP 04-211308 A, and a fruit body obtained by this method can be used as a cutting. For cultivating a shiitake mushrooms, fungal bed cultivation is carried out by using the method described, for example, in JP 04-075538 A, and a fruit body obtained by this method can be used as a cutting. For cultivating a bunashimeji mushroom (*Hypsizigus marmoreus*, formerly classified as *Lyophyllum ulmarium*), fungal bed cultivation is carried out by using the method described, for example, in JP 05-268942 A, and a fruit body obtained by this method can be used as a cutting. For other mushrooms, a suitable cultivation method can be selected, and a cultivated fruit body, preferably a young fruit body, can be used as a cutting.

According to the present invention, control of the location where a matured fruit body of a mushroom is generated, which has been difficult in conventional fungal bed cultivation, will be greatly facilitated. Among the effects of the present invention, there is such an effect that the control of harvesting time and uniformity of the shape of matured fruit bodies are facilitated.

In the fourth aspect of the present invention, there is provided a culture medium which can be also preferably used for conventional fungal bed cultivation of a hon-shimeji mushroom. The culture medium is that for fungal bed cultivation of a hon-shimeji mushroom which comprises sawdust and corn. This culture medium is characterized in that the sawdust is solely derived from a conifer.

The present invention also provides a method for fugal bed cultivation of a hon-shimeji mushroom which comprises inoculating a hon-shimeji mushroom in the culture medium for fungal bed cultivation according to the fourth aspect of the present invention in a wet state with water to generate a fruit body thereof. Naturally, the fourth aspect of the present invention can be preferably used for the fungal bed cultivation method according to the first aspect of the invention.

Fugal bed cultivation of a hon-shimeji mushroom was succeeded for the first time by Ohta at the Shiga Prefectural Forest Research Center so far and JP 07-115844 A discloses a fungal bed cultivation method of a hon-shimeji mushroom using wheat or barley. Transactions of the Mycological Society of Japan, 39: 13-20, 1998 discloses an experiment for generating a fruit body of a hon-shimeji mushroom on a culture medium using wheat or barley. Further, JP 06-153695 A discloses a method for culturing mycelia of mycorrhizal fungi on a culture medium based on peat moss supplemented with starch and other components, and the inventors of this patent application report an experiment for generating a fruit body of a hon-shimeji mushroom on a culture medium based on peat moss supplemented with starch and other components in Transactions of the Mycological Society of Japan, 35: 192-195, 1994.

However, in the method described in JP 07-115844 A, the cost of a culture medium is high because expensive wheat or barley is used in the culture medium. The method disclosed in JP 06-153695 A has not reached the level of commercial production because of a low yield of fruit bodies generated.

In recent years, various methods for cultivating a hon-shimeji mushroom have been disclosed for the purpose of commercial production. JP 2000-106752 A discloses a culture medium for fungal bed cultivation of a hon-shimeji mushroom which comprising a Panicoideae plant, and a method for cultivating a hon-shimeji mushroom comprising using the culture medium. JP 2002-247917 A discloses a fungal bed cultivation method of a hon-shimeji mushroom which comprises preparing a mixed culture medium containing at least corn powder and broad-leaf tree sawdust, placing the mixed culture medium in a wet state with water, inoculating the culture medium with mycelia of a hon-shimeji mushroom, and cultivating the mycelia at a temperature of 30° C. or lower to generate fruit bodies.

JP 2005-27585 A discloses a fungal bed cultivation method of a hon-shimeji mushroom which comprises adding and mixing milled oyster shells to a medium in such a state that fruit bodies can be generated by inoculating and cultivating mycelia of a hon-shimeji mushroom in a wet state with water, and adjusting pH of the culture medium to 7 or below.

JP 2007-54044 A discloses a fungal bed cultivation method of a hon-shimeji mushroom which comprises using a mixed culture medium prepared by adding and mixing a small amount of wheat or barley, and/or rice to a culture medium containing corn and sawdust, and inoculating and cultivating a hon-shimeji mushroom on the culture medium in a wet state with water to generate fruit bodies.

Based on the technique disclosed in JP 2000-106752 A, the present inventors have started the commercial production of a hon-shimeji mushroom by a conventional fungal bed cultivation method without using cuttings, which is different from the fungal bed cultivation method of the first aspect of the present invention. However, it was revealed that, in a conventional fungal bed cultivation method, cultivation becomes unstable due to large scale cultivation, when the production scale exceeds 4 tons per lot in terms of the amount of the culture medium to be prepared. This has raised a problem in stable commercial cultivation. In order to resolve this instability, the present inventors have studied cultivation and investigated the influence of each factor affecting a conventional fungal bed cultivation of a hon-shimeji mushroom on the large scale cultivation.

It has been known that, in the cultivation of mushrooms, growth of mushrooms is affected by the tree species from which sawdust to be used is derived. As described in the above JP 07-115844 A and Transactions of the Mycological Society of Japan, 39: 13-20, 1998, it has been also reported that sawdust of broad-leaf tree is preferred for fungal bed cultivation of a hon-shimeji mushroom and the use of conifer sawdust reduces the productivity.

The other patent documents cited above have also reported that broad-leaf tree sawdust is preferred. For example, JP 2007-54044 A describes that broad-leaf tree sawdust is preferred. JP 2005-27585 A uses broad-leaf tree sawdust. JP 2002-247917 A discloses broad-leaf tree sawdust as a constituent feature of the invention. In JP 2000-106752 A, the invention is carried out in practice using broad-leaf tree sawdust.

As described above, the instability of cultivation was revealed in the production of a hon-shimeji mushroom at a scale exceeding 4 tons per lot in terms of the amount of a culture medium to be prepared, and the unstable production of matured fruit bodies was caused with the variation from lot to lot. Thus, cultivation studies has been conducted relating to each factor which influences fungal bed cultivation of a hon-shimeji mushroom such as mushroom production facilities, environmental setting and preparation of a culture medium, and its influence on the large scale production has been investigated for optimization of the cultivation. As a result, surprisingly, it has been found that broad-leaf tree sawdust which has been considered to be suitable for conventional fungal bed cultivation of a hon-shimeji mushroom is unsuitable for large scale commercial cultivation. The present inventors has found that efficient and stable large scale production of a hon-shimeji mushroom can be realized by using only conifer sawdust, which has been recognized to be unsuitable for cultivation of a hon-shimeji mushrooms according to a conventional cultivation technique, thereby completing the fourth aspect of the present invention. Furthermore, as the fifth aspect of the present invention, there is provided a culture medium for fungal bed cultivation which enables one to realize stable production of a hon-shimeji mushroom even in conventional large scale commercial cultivation.

Hereinafter, the fourth and fifth aspects of the present invention will be illustrated in detail.

In an embodiment of the present invention, there is provided a culture medium of fungal bed cultivation of a hon-shimeji mushroom which comprises sawdust and corn, wherein the sawdust is solely derived from a conifer. Sawdust derived from a cedar is preferred as the sawdust derived from a conifer. The sawdust is not specifically limited, and conventional sawdust can be used and the particle size of sawdust can be appropriately selected within the range generally used for fungal bed cultivation of mushrooms. Chipdust can also be used as sawdust, and the use of chipdust is also encompassed in the scope of the present invention. In an embodiment of the present invention, there is provided a culture medium for fungal bed cultivation wherein corn is substantially used as a nutrient source for a hon-shimeji mushroom. Corn may be one containing any material selected from corn grains, for example, ground corn grains, a heat-treated product, a flaked product, and the like. In the present invention, efficient cultivation of a hon-shimeji mushroom can also be achieved by using corn as a sole nutrient source. As an embodiment of the present invention, it becomes possible for the first time to carry out large scale cultivation of a hon-shimeji mushroom by using the culture medium for fungal bed cultivation to prepare a conventional fugal bed for cultivation of mushrooms in a wet state with water, and inoculating the hon-shimeji mushroom.

A strain of a hon-shimeji mushroom to be used for the fourth and fifth aspects of the present invention is not specifically limited as long as it is suitable for a particular culture media and cultivation method to be used. For example, the *Lyophyllum shimeji* strain described in JP 2001-120059 A can be exemplified as a preferred strain to be used.

As used herein, the term "corn" refers to any material containing corn grains, including fresh and dried products. Further, either whole grains or a portion of grains separated by processing can also be used. Alternatively, portions of separated grains can be mixed, or whole grains can be used by mixing with a separated portion. Processed products include ground grains, dust of adjusted size obtained by sieving after grinding of grains, heat-flaked grains, and grains shaped into granules or pellets. Any processing method, any shape of processed products, and any particle size can be employed in the present invention. Furthermore, two or more processed products can be used in combination, or whole grains and processed products can be combined. Examples of the corn preferably used in the present invention include heat-flaked corn widely marketed as animal feed.

Sawdust derived from a conifer is used in the present invention. The conifer refers to a group of gymnospermous plants including those of the Pinaceous, Taxodiaseae, Cupressaceae, Taxaceae and Cephalotaxaceae falimiles. Any sawdust can be used in the present invention as long as it is derived from plants of these families, and it can be used either alone or in combination. Further, in the present invention, it is preferred to use sawdust with improved water-retention capacity obtained by subjecting sawdust just obtained to piling treatment with water sprinkling rather than immediately using sawdust just obtained.

Bottle cultivation, bag cultivation, box cultivation and the like can be applied to the fungal bed cultivation method of a hon-shimeji mushroom of the fifth aspect of the present invention. Herein, the fungal bed cultivation method of a mushroom of the fifth aspect of the present invention by bottle cultivation is used as an example. This method comprises the steps of preparation of a culture medium, filling a bottle, sterilizing, inoculating, cultivating, scratching fungi if necessary, sprouting, growing, harvesting, and the like. These steps will be specifically illustrated hereinafter, but the present invention is not limited thereto.

The preparation of a culture medium will be illustrated in detail. The medium for fungal bed cultivation of a hon-shimeji mushroom of the forth aspect of the present invention can be any medium as long as it contains corn and sawdust solely derived from a conifer.

The mixing ratio of corn and sawdust of a conifer is illustrated by using a case of heat-flaked corn and sawdust derived from cedar wood (cedar sawdust) as an example. Any mixing ratio of corn and sawdust of a conifer can be employed as long as a hon-shimeji mushrooms can be cultivated by using the culture medium of the present invention. However, from the viewpoint of improving the yield, the lower limit of the content of heat-flaked corn is at least 40%, preferably at least 50%, more preferably at least 60% in the medium for fungal bed cultivation as a dry weight ratio. When the ratio is less than 40%, the yield of a hon-shimeji mushroom obtained is significantly reduced, which is undesirable. In addition, since heat-flaked corn has low water absorption properties, the water-retention capacity of a culture medium for fungal bed cultivation is reduced when the content of heat-flaked corn in the medium is too high, sometimes resulting in poor fungal extension throughout a culture medium due to water residence in the bottom of a culture bottle. That is, the upper limit of heat-flaked corn is 80% or less, preferably 75% or less, more preferably 70% or less in the medium for fungal bed cultivation as a dry weight ratio.

The water content of the medium for fungal bed cultivation will be illustrated by also using a case of heat-flaked corn and cedar sawdust as an example. Preferably, the water content of the medium is adjusted in accordance with a common knowledge in the art, and it include, for example, but not limited to, 68% by weight or less, more preferably 66% by weight or less. However, if the water content exceeds 64% by weight, poor fungal extension throughout a culture medium may occur due to reduction of air space in the medium, resulting in poor yield and quality of the fruit bodies obtained. Therefore, more preferably, the water content is adjusted to 64% by weight or less. However, if the water content is too low, the medium is adversely affected by dehydration, and the like, which cause poor fungal extension throughout a culture medium, deformation of fruit bodies, and poor development. Thus, the water content is adjusted preferably to at least 50% by weight, more preferably at least 55% by weight. The water content can be appropriately varied according to the texture of the medium in which the water content is adjusted.

The steps of filling a bottle, sterilization, inoculation, cultivation and sprouting can be carried out similarly as those described with respect to the above method of the fungal bed cultivation of a hon-shimeji mushroom using a cutting.

The fruit body primordia and young fruit bodies formed through a sprouting step can be directly subjected to a growing step, or they can be used as cuttings in the fungal bed cultivation of a hon-shimeji mushroom described above.

The growing step can be carried out similarly as that described with respect to the above method of the fungal bed cultivation of a hon-shimeji mushroom using a cutting.

Matured fruit bodies can be obtained by the fungal bed cultivation method described in the fifth aspect of the present invention using the culture medium described in the fourth aspect of the present invention and, after harvesting them, all the steps of the cultivation are terminated. By virtue of the fourth and fifth aspects of the present invention, commercial cultivation of a hon-shimeji mushroom becomes highly stable and the ununiformity in yield among cultivation lots is significantly improved. The fourth and fifth aspects of the present invention is described above with reference to bottle cultivation, but the present invention can be applied to any fungal bed cultivation of mushrooms and is not limited to the bottle cultivation described above.

The present invention will now be described in more detail with reference to the following examples, but the present invention is not limited to only the scope of the examples.

EXAMPLE 1

Mycelia of *Lyophyllum shimeji* La 01-27 strain (FERM BP-10960) were inoculated into 100 mL of PGY liquid culture medium (composition: glucose 2.0% (w/v), peptone 0.2% (w/v), yeast extract 0.2% (w/v), $KH_2PO_4$ 0.05% (w/v), and $MgSO_4 \cdot 7H_2O$ 0.05% (w/v)). After culturing at 25° C. for 7 days with shaking (100 rpm), 2 mL of the culture was inoculated into 200 mL of the same medium and subcultured for 7 days with shaking (100 rpm). Further, all the subculture was inoculated into a 200-L jar fermentor (Komatsugawa Manufacturing) containing 160 L of the same medium and cultured for 6 days with stirring (stirring rate: 100 rpm; aeration volume: 25 L/min) to prepare a liquid seed culture. On the other hand, flaked corn (manufactured by Iisaka Seibaku) and sawdust of a conifer, i.e., cedar sawdust (manufactured by Tomoe Bussan Co., Ltd.) were mixed at a dry weight ratio of 2:1 (flaked corn:sawdust of a conifer), and water was added thereto so that the final water content in the resulting culture medium became 62% by weight. The mixture was thoroughly mixed while stirring, and wide-mouthed culture-bottles (1100 mL) made of polypropylene were filled with 800 g aliquots of the mixture while applying pressure. In all, five holes were made on the mixture filled in each bottle in such a manner that one hole with an aperture diameter of 1.5 cm and a depth of about 10 cm was made on the center portion of the surface of the filled mixture, and the other four holes each having an aperture diameter of 1.0 cm and a depth of about 10 cm were evenly distributed on the circumference of a circle with a diameter of 4 cm drawn from the center of the surface of the mixture filled in the bottle. Then, the culture bottles were stoppered with caps, autoclaved at 118° C. for 30 minutes, and allowed to cool to 20° C., thereby preparing culture media for fungal bed cultivation (solid media). About 25 mL of the above-mentioned liquid seed culture was inoculated to each solid medium, and the mycelia were cultured in a dark place at a temperature of 20° C. and at a humidity of 70 to 75% for 104 days so that the mycelia extended throughout the medium. The caps were then removed and the bottles were reversed. Thereafter, the bottles were transferred to a sprouting chamber where the temperature was controlled to 15° C. and the humidity was controlled to 115 to 120% by the indication value on HUMID EYE 100 (manufactured by Saginomiya Seisakusho, Inc.), and sprouting was carried out under the illumination of 100 lux or less. The bottles were then reversed to the normal direction for each one case (16 bottles) at days 5, 7, 8, 9, 10 and 13 of the sprouting to firstly remove all the fruit body primordia and young fruit bodies generated on the surface of each solid medium, from which young fruit bodies were isolated, and those with the length indicated in Table 1 were selected as cuttings. Each one of the cuttings were embedded using tweezers into each of the five holes in each original solid medium from which the fruit body primordia and young fruit bodies had been removed. Subsequently, the media were transferred into a growing chamber where the temperature was controlled to 15° C. and the humidity was controlled to 105 to 120% by the indication value on HUMID EYE 100 (manufactured by Saginomiya Seisakusho, Inc.), and the cuttings were allowed to grow under the illumination of 50 to 100 lux or less for 8 to 16 days to obtain matured fruit bodies. The matured fruit bodies were harvested. Table 1 shows the yield of fruit bodies per bottle for each experimental group.

TABLE 1

| Experimental group | Length of cutting (mm) | Yield of fruit bodies per bottle (g) |
|---|---|---|
| Day 5 of sprouting | 3 | 42.5 |
| Day 7 of sprouting | 5 | 94.7 |
| Day 8 of sprouting | 10 | 89.1 |
| Day 9 of sprouting | 15 | 90.3 |
| Day 10 of sprouting | 20 | 77.5 |
| Day 13 of sprouting | 30 | 41.6 |

The results showed that, in the fungal bed cultivation of a hon-shimeji mushroom, it became possible to cultivate a hon-shimeji mushroom by transplanting a fruit body as a cutting. In particular, fruit bodies were obtained in a good yield in the groups of Days 7 to 10 of sprouting. Further, the fruit bodies obtained in each bottle showed uniformity in size. This showed that the method was suitable for commercial cultivation. In the group of Day 5 of sprouting, the length of the cutting was as short as 3 mm, and many young fruit bodies failed to grow because they were damaged during the operation or they fell during their growth. Thus, in this group, fruit bodies with an excellent shape were not obtained in a sufficient amount. In the group of Day 13 of sprouting, the cutting could not sufficiently grow, and only fruit bodies having thin stalks and flat pilei with low commercial value were obtained.

EXAMPLE 2

Cultivation was carried out using the method described in Example 1. The sprouting step was terminated on Day 9 of sprouting, all the fruit body primordia and young fruit bodies were firstly removed after inversion, and cuttings were selected from the removed young fruit bodies. Five cylindrical holes with an aperture diameter of 5 mm and a depth of 5 mm were newly made with spatula on the original solid medium from which the fruit body primordia and young fruit bodies had been removed. Each one of cuttings previously isolated that had a length of 15 mm was embedded into each hole and was allowed to grow. In this cultivation, preferred results similar to those obtained from Day 9 group in Example 1 were obtained.

EXAMPLE 3

Cultivation was carried out using the method described in Example 1. On Day 9 of the sprouting, young fruit bodies with a length of about 15 mm were isolated as cuttings. The cultivation was continued using the method described in Example 1 until the cultivating step was completed. Each one of the cuttings was embedded into the five holes of a different solid medium from which all the fruit body primordia and young fruit bodies generated had been removed, and the cuttings were allowed to grow as described in Example 1. In this cultivation, preferred results similar to those obtained from Day 9 group in Example 1 were obtained.

EXAMPLE 4

According to the method described in JP 04-211308 A, fungal bed cultivation of a hatakeshimeji mushroom was carried out, and its young fruit bodies were isolated as cuttings. Matured fruit bodies can be obtained by transplanting the cuttings into a culture medium for fungal bed cultivation in which mycelia have extended throughout the culture medium.

EXAMPLE 5

According to the method described in JP 04-075538 A, fungal bed cultivation of a shiitake mushroom was carried out, and its young fruit bodies were isolated as cuttings. Mature fruit bodies can be obtained by transplanting the cuttings into a culture medium for fungal bed cultivation in which mycelia have extended throughout the culture medium.

EXAMPLE 6

According to the method described in JP 04-268942 A, fungal bed cultivation of a bunashimeji mushroom was carried out, and its young fruit bodies were isolated as cuttings. Mature fruit bodies can be obtained by transplanting the cuttings into a culture medium for fungal bed cultivation in which mycelia have extended throughout the culture medium.

EXAMPLE 7

Mycelia of *Lyophyllum shimeji* strain La 01-27 (FERM BP-10960) were inoculated into 100 mL of PGY liquid culture medium (composition: glucose 2.0% (w/v), peptone 0.2% (w/v), yeast extract 0.2% (w/v), $KH_2PO_4$ 0.05% (w/v), and $MgSO_4 \cdot 7H_2O$ 0.05% (w/v)). After culturing at 25° C. for 7 days with shaking (100 rpm), 2 mL of the culture was inoculated into 200 mL of the same medium, and subcultured for 7 days with shaking (100 rpm). Further, all the subculture was inoculated into a 200-L jar fermentor (Komatsugawa Manufacturing) containing 160 L of the same medium and cultured for 6 days with stirring (stirring rate: 100 rpm; aeration volume: 25 L/min) to prepare a liquid seed culture. On the other hand, flaked corn (manufactured by Iisaka Seibaku) and sawdust of a conifer, i.e., cedar sawdust (manufactured by Tomoe Bussan Co., Ltd.) were mixed at a dry weight ratio of 2:1 (flaked corn:sawdust of a conifer), and water was added thereto so that the final water content in the resulting culture medium became 62% by weight. The mixture was thoroughly mixed while stirring, and about 5000 wide-mouthed culture bottles (1100 mL) made of polypropylene per lot were filled with 800 g aliquots of the mixture while applying pressure. In all, five holes were made on the mixture filled in each bottle in such a manner that one hole with an aperture diameter of 1.5 cm and a depth of about 10 cm was made on the center portion of the surface of the filled mixture, and the other four holes each having an aperture diameter of 1.0 cm and a depth of about 10 cm were evenly distributed on the circumference of a circle with a diameter of 4 cm drawn from the center of the surface of the mixture filled in the bottle. Then, the culture bottles were stoppered with caps, autoclaved at 118° C. for 30 minutes, and allowed to stand to cool to 20° C., thereby preparing culture media for fungal bed cultivation (solid media). About 25 mL of the above-mentioned liquid seed culture was inoculated to each solid medium, and the mycelia were cultured in a dark place at a temperature of 20° C. and at a humidity of 70 to 75% for 110 days so that the mycelia extended throughout the medium. The caps were then removed and the bottles were reversed. Thereafter, the bottles were transferred to a sprouting chamber where the temperature was controlled to 15° C. and the humidity was controlled to 115 to 120% by the indication value on HUMID EYE 100 (manufactured by Saginomiya Seisakusho, Inc.), and sprouting was carried out for 10 days under the illumination of 100 lux or less. Each bottle was then reversed to the normal direction and unnecessary sprouts other than 4 to 5 sprouts having a good shape, which were to be grown into fruit bodies, were removed using a spatula, from plural sprouts generated on the surface of each medium, followed by allowing to stand for additional 10 to 11 days. Subsequently, the bottles were transferred into a growing chamber where the temperature was controlled to 15° C. and the humidity was controlled to 105 to 120% by the indication value on HUMID EYE 100 (manufactured by Saginomiya Seisakusho, Inc.), and the sprouts were allowed to grow under the illumination of 50 to 100 lux or less for 9 to 11 days to obtain matured fruit bodies. The matured fruit bodies were harvested. The following table shows the results of 10 lots prepared by the above-described method.

TABLE 2

| Lot number of cedar sawdust | Average yield per culture bottle (g) |
| --- | --- |
| 060509 | 28.4 |
| 060511 | 26.7 |
| 060516 | 35.9 |
| 060518 | 35.7 |
| 060525 | 40.2 |
| 060530 | 29.7 |
| 060606 | 40.5 |
| 060613 | 42.2 |
| 060627 | 34.4 |
| 060629 | 35.8 |
| Mean | 35.0 |
| Standard deviation | 5.29 |

In the cultivation using cedar sawdust, variation among the lots in the average yield per culture bottle was small, thereby enabling one to stably produce a hon-shimeji mushroom. These results were satisfactory for using this method as commercial cultivation.

COMPARATIVE EXAMPLE

The cultivation was carried out using the same method as that described in Example 7 except that sawdust was replaced with sawdust derived from a broad-leaf tree (broad-leaf tree sawdust: Tomoe Bussan Co., Ltd.). The results are shown below.

TABLE 3

| Lot number of broad-leaf tree sawdust | Average yield per culture bottle (g) |
| --- | --- |
| 051206 | 21.7 |
| 051220 | 26.7 |
| 051227 | 46.3 |
| 060117 | 37.5 |
| 060124 | 30.6 |
| 060131 | 24.5 |
| 060214 | 18.7 |
| 060228 | 16.4 |
| 060221 | 14.1 |
| 060411 | 8.5 |
| Mean | 24.5 |
| Standard deviation | 11.34 |

In the cultivation using broad-leaf tree sawdust, as compared with the cultivation using cedar sawdust, variation among the lots in average yield per culture bottle was observed. The yield was also low as compared with that obtained in above Example 1. These results were not satisfactory as commercial cultivation.

EXAMPLE 8

Mycelia of *Lyophyllum shimeji* strain La 01-27 (FERM BP-10960) were inoculated into 100 mL of PGY liquid culture medium (composition: glucose 2.0% (w/v), peptone 0.2% (w/v), yeast extract 0.2% (w/v), $KH_2PO_4$ 0.05% (w/v), and $MgSO_4.7H_2O$ 0.05% (w/v)). After culturing at 25° C. for 7 days with shaking (100 rpm), 2 mL of the culture was inoculated into 200 mL of the same medium, and subcultured for 7 days with shaking (100 rpm). Further, all the subculture was inoculated into a 200-L jar fermentor (Komatsugawa Manufacturing) containing 160 L of the same medium and cultured for 6 days with stirring (stirring rate: 100 rpm; aeration volume: 25 L/min) to prepare a liquid seed culture. On the other hand, flaked corn (manufactured by Iisaka Seibaku) and sawdust of a conifer, i.e., cedar sawdust (manufactured by Tomoe Bussan Co., Ltd.) were mixed at a dry weight ratio of 2:1 (flaked corn:sawdust of a conifer), and water was added thereto so that the final water content in the resulting culture medium became 62% by weight. The mixture was thoroughly mixed while stirring, and wide-mouthed culture bottles (1100 mL) made of polypropylene were filled with 800 g aliquots of the mixture (including bottle and cap) while applying pressure. In all, five holes were made on the mixture filled in each bottle in such a manner that one hole with an aperture diameter of 2 cm and a depth of about 10 cm was made on the center portion of the surface of the filled mixture, and the other four holes each having an aperture diameter of 1.0 cm and a depth of about 10 cm were evenly distributed on the circumference of a circle with a diameter of 4 cm drawn from the center of the surface of the mixture filled in the bottle. Then, the culture bottles were stoppered with caps, autoclaved at 118° C. for 30 minutes, and allowed to stand to cool to 20° C., thereby preparing culture media for fungal bed cultivation (solid media). About 25 mL of the above-mentioned liquid seed culture was inoculated to each solid medium, and the mycelia were cultured in a dark place at a temperature of 20° C. and at a humidity of 70 to 75% for 111 to 113 days so that the mycelia extended throughout the medium. The caps were then removed and the bottles were reversed. Thereafter, the bottles were transferred to a sprouting chamber where the temperature was controlled to 15° C. and the humidity was controlled to 115 to 120% by the indication value on HUMID EYE 100 (manufactured by Saginomiya Seisakusho, Inc.), and sprouting was carried out under the illumination of 20 lux or less (light:dark=30 min:30 min). On Day 7 of sprouting, bottles were reversed to the normal direction and transferred into a growing chamber where the temperature was controlled to 15° C., the humidity was controlled to 100 to 110% by the indication value on HUMID EYE 100 (manufactured by Saginomiya Seisakusho, Inc.), and the illumination was controlled to 50 to 100 lux or less (light:dark=30 min:30 min), and sprouting was carried out for additional 3 days to obtain young fruit bodies to be used as cuttings.

On the other hand, cultivation was carried out according to the same method as that described in Example 1 for 70, 77, 92, 99, 113, 121 or 128 days to obtain cultures, and 16 bottles of each culture per case were prepared as cultures into which the cuttings were to be transplanted. Each one of four cuttings was embedded into each hole of four holes each having an aperture diameter of 1 cm in each bottle, and they were allowed to grow for 11 to 14 day in a growing chamber where the humidity was controlled to 105 to 120% by the indication value on HUMID EYE 100 (manufactured by Saginomiya Seisakusho, Inc.) to obtain matured fruit bodies. The following table shows the average yields (g) obtained in each experimental group.

TABLE 4

| Experimental group | Average yield per bottle (g) |
|---|---|
| 70 days of cultivation | 36.5 |
| 77 days of cultivation | 74.8 |
| 92 days of cultivation | 110.8 |
| 99 days of cultivation | 109.8 |
| 113 days of cultivation | 92.9 |
| 121 days of cultivation | 57.5 |
| 128 days of cultivation | 54.8 |

These results showed that matured fruit bodies could be obtained by transplanting cuttings into the cultures after 70 to 128 days of cultivation.

EXAMPLE 9

Cultivation was carried out according to the same method as that described in Example 8 except that the cultivation period was 104 days to obtain bottles of cultures. The caps were then removed, and the bottles were reversed and subjected to sprouting in a sprouting chamber where the temperature was controlled at 15° C., the humidity was controlled to 115 to 120% by the indication value on HUMID EYE 100 (manufactured by Saginomiya Seisakusho, Inc.), and the illumination was controlled to 20 lux or less (light:dark=30 min:30 min). Then, 4, 5, 6, 7, 8, 9, or 10 days after sprouting, the bottles were reversed and then transferred to a growing chamber where the temperature was controlled at 15° C., the humidity was controlled to 100 to 110% by the indication value on HUMID EYE 100 (manufactured by Saginomiya Seisakusho, Inc.), and the illumination was controlled to 50 to 100 lux (light:dark=30 min:30 min). The sprouting was continued in the growing chamber, and young fruit bodies to be used as cuttings were obtained after 6, 5, 4, 3, 2, 1, or 0 days, respectively.

Cultivation was carried out according to the same method as that described in Example 8 except that cultivation period was 105 days to obtain bottles of cultures into which the cuttings were to be transplanted. Each one of four cuttings was embedded into each of four holes each having an aperture diameter of 1 cm in each bottle, and they were allowed to grow for 11 to 14 day in a growing chamber where the humidity was controlled to 105 to 120% (light:dark=30 min:30 min) by the indication value on HUMID EYE 100 (manufactured by Saginomiya Seisakusho, Inc.) to obtain matured fruit bodies. The following table shows the average yields (g) obtained in each experimental group (16 bottles/case).

TABLE 5

| Experimental group | Average yield per bottle (g) |
|---|---|
| 4 days of reversion: 6 day of normal position | 93.0 |
| 5 days of reversion: 5 day of normal position | 86.7 |
| 6 days of reversion: 4 day of normal position | 86.0 |
| 7 days of reversion: 3 day of normal position | 91.7 |
| 8 days of reversion: 2 day of normal position | 88.3 |
| 9 days of reversion: 1 day of normal position | 73.3 |
| 10 days of reversion: 0 day of normal position | 78.0 |

As seen from the above results, a sufficient amount of average yield could be obtained in each experimental group where the humidity and illumination were varied in the sprouting step until young fruit bodies were obtained.

EXAMPLE 10

Cultivation was carried out according to the method described in Example 8 except that the cultivation period was 102 days to obtain bottles of cultures. The capes were then removed, and the bottles were reversed and subjected to sprouting in a sprouting chamber where the temperature was controlled at 15° C., the humidity was controlled to 115 to 120% by the indication value on HUMID EYE 100 (manufactured by Saginomiya Seisakusho, Inc.), and the illumination controlled to 20 lux or less (light:dark=30 min:30 min). The sprouting step was terminated on Day 7 of sprouting to obtain young fruit bodies to be used as cuttings. Cultivation was carried out according to the same method as that described in Example 8 except that the cultivation period was 102 days to obtain bottles of cultures. Each one of the cuttings was embedded in each of the four inoculation holes each having an aperture diameter of 1 cm or a cylindrical hole with an aperture diameter of 5 mm and a depth of 5 mm newly made with spatula in each bottle. The cuttings were allowed to grow for 14 days in a growing chamber where the temperature was controlled at 15° C., the humidity was controlled to 105 to 120% by the indication value on HUMID EYE 100 (manufactured by Saginomiya Seisakusho, Inc.), and the illumination was controlled to 50 to 100 lux (light:dark=30 min:30 min) to obtain matured fruit bodies. The following table shows the average yields (g) per bottle obtained in each experimental group.

TABLE 6

| Experimental group | Average yield per bottle (g) |
|---|---|
| Inoculation hole | 122.3 |
| Other than inoculation hole | 101.6 |

As seen from the above results, a sufficient yield, comparable to the yield from the inoculation holes was obtained when young fruit bodies were embedded in the newly made hole other than inoculation holes.

EXAMPLE 11

Sprouting was carried out according to the method described in Example 10 except that the cultivation period was 113 days, and the young fruit bodies obtained on Day 7 of sprouting were isolated from the media to be used as cuttings. The cuttings were stored for 0, 1, or 2 days in a growing chamber where the temperature was controlled at 15° C., the humidity was controlled to about 105% according to the indication value on HUMID EYE 100 (manufactured by Saginomiya Seisakusho, Inc.), and the illumination was controlled to 50 to 100 lux (light:dark=30 min:30 min). Then, each one of the cuttings was transplanted into each of four inoculation holes each having an aperture diameter of 1 cm of the culture which had been cultivated according to the method described in Example 8 except that the cultivation period was 112 days, followed by growth for 14 days in a growing chamber where the temperature was controlled at 15° C., the humidity to 105 to 120% by the indication value on HUMID EYE 100 (manufactured by Saginomiya Seisakusho, Inc.), and the illumination was controlled to 50 to 100 lux (light:

dark=30 min:30 min) to obtain matured fruit bodies. The following table shows the average yields (g) per bottle achieved in each experimental group.

TABLE 7

| Experimental group | Average yield per bottle (g) |
|---|---|
| 0 day of storage | 42.6 |
| 1 day of storage | 37.8 |
| 2 days of storage | 40.8 |

As seen from the above results, the yields in the groups of 1 and 2 days of storage were almost equal to that obtained in the 0 day group. This shows that young fruit bodies can be stored for up to 2 days.

INDUSTRIAL APPLICABILITY

According to the present invention, there is provided a cutting used for a fungal bed cultivation method of a fruit body of a mushroom of a large size with a high commercial value, a culture medium for fungal bed cultivation into which the cutting is transplanted, and a fungal bed cultivation method of a mushroom using the cutting. Also provided are a culture medium that enables one to stably produce a hon-shimeji mushroom even using a conventional fungal-bed cultivation method, and a fungal bed cultivation method using the culture medium. The method of cultivating a hon-shimeji mushroom using these materials will improve the yield of a hon-shimeji mushroom, thereby providing a culture medium for stable cultivation of a hon-shimeji mushroom.

The invention claimed is:

1. A method for fungal bed cultivation of a mushroom, said method comprising:
   transplanting an isolated young fruit body of a mushroom cultivated on a fungal bed into surface of a solid culture medium in which mushroom mycelia have extended throughout the solid culture medium, and
   growing the transplanted young fruit body into a matured fruit body.

2. The method according to claim 1, wherein the mushroom is a hon-shimeji mushroom (*Lyophyllum shimeji*).

3. An isolated young fruit body of a mushroom cultivated on a fungal bed to be used in a method for fungal bed cultivation of a mushroom, said method comprising:
   transplanting the isolated young fruit body of a mushroom cultivated on a fungal bed to the surface of a solid culture medium in which mushroom mycelia have extended throughout the solid culture medium, and
   growing the young fruit body to a matured fruit body.

4. The isolated young fruit body of a mushroom according to claim 3, wherein the mushroom is a hon-shimeji mushroom (*Lyophyllum shimeji*).

5. A culture medium in which mycelia of the mushroom have extended throughout the solid culture medium into which the isolated young fruit body of a mushroom of claim 3 or 4 has been transplanted.

6. A method for fungal bed cultivation of a mushroom, said method comprising:
   (a) inoculating a seed culture of the mushroom on a solid culture medium for fungal bed cultivation to prepare a first culture medium in which mushroom mycelia have extended throughout the solid culture medium;
   (b) growing a young fruit body from the first culture medium obtained in (a);
   (c) isolating the young fruit body grown in (b);
   (d) separately from (a), inoculating a seed culture of the mushroom on a solid culture medium for fungal bed cultivation to prepare a second culture medium in which mushroom mycelia have extended throughout the solid culture medium;
   (e) transplanting the young fruit body isolated in (c) on the second culture medium prepared in (d); and
   (f) growing the young fruit body transplanted in (e) into a matured fruit body.

* * * * *